US011521379B1

(12) United States Patent
Wang et al.

(10) Patent No.: US 11,521,379 B1
(45) Date of Patent: Dec. 6, 2022

(54) METHOD FOR FLOOD DISASTER MONITORING AND DISASTER ANALYSIS BASED ON VISION TRANSFORMER

(71) Applicants: NANJING UNIVERSITY OF INFORMATION SCIENCE & TECHNOLOGY, Nanjing (CN); NATIONAL CLIMATE CENTER, Beijing (CN)

(72) Inventors: Guojie Wang, Nanjing (CN); Buda Su, Beijing (CN); Yanjun Wang, Nanjing (CN); Tong Jiang, Beijing (CN); Aiqing Feng, Beijing (CN); Lijuan Miao, Beijing (CN); Mingyue Lu, Nanjing (CN); Zhen Dong, Yangzhou (CN)

(73) Assignees: NANJING UNIVERSITY OF INFORMATION SCI. & TECH., Nanjing (CN); NATIONAL CLIMATE CENTER, Beijing (CN)

( * ) Notice: Subject to any disclaimer, the term of this patent is extended or adjusted under 35 U.S.C. 154(b) by 0 days.

(21) Appl. No.: 17/857,147

(22) Filed: Jul. 4, 2022

(30) Foreign Application Priority Data

Sep. 16, 2021 (CN) .......................... 202111087346.6

(51) Int. Cl.
*G06V 20/10* (2022.01)
*G06V 20/13* (2022.01)
(Continued)

(52) U.S. Cl.
CPC ............. *G06V 20/182* (2022.01); *G06N 3/08* (2013.01); *G06V 10/26* (2022.01); *G06V 10/62* (2022.01);
(Continued)

(58) Field of Classification Search
None
See application file for complete search history.

(56) References Cited

U.S. PATENT DOCUMENTS

2017/0193305 A1\* 7/2017 Apelbaum ............. G06V 20/46
2021/0149929 A1\* 5/2021 Shen ....................... G06N 20/00
(Continued)

FOREIGN PATENT DOCUMENTS

CN 108257154 A 7/2018
CN 113191285 A 7/2021

OTHER PUBLICATIONS

Peng ZHang et al "Automatic Extraction of Water and Shadowl From Sar Images Based on a Mutli-Resolution Dense Encoder and Decoder Network", School of Electrical and Information Engineering, Changsha University of Science & Technology, Aug. 2019. (Year: 2019).\*

(Continued)

*Primary Examiner* — Leon Flores
(74) *Attorney, Agent, or Firm* — Hemisphere Law, PLLC; Zhigang Ma

(57) ABSTRACT

A method for flood disaster monitoring and disaster analysis based on vision transformer is provided. It includes: step (1), constructing a bi-temporal image change detection model based on vision transformer; step (2), selecting bi-temporal remote sensing images to make flood disaster labels; and step (3), performing flood monitoring and disaster analysis according to the bi-temporal image change detection model constructed in the step (1). In combination with the bi-temporal image change detection model based on an advanced vision transformer in deep learning and radar data which is not affected by time and weather and has strong penetration ability, data when floods occur can be obtained and recognition accuracy is improved.

2 Claims, 2 Drawing Sheets

(51) Int. Cl.
   *G06V 10/62* (2022.01)
   *G06N 3/08* (2006.01)
   *G06V 10/774* (2022.01)
   *G06V 10/77* (2022.01)
   *G06V 10/26* (2022.01)
   *G06V 10/82* (2022.01)

(52) U.S. Cl.
   CPC ........ *G06V 10/774* (2022.01); *G06V 10/7715* (2022.01); *G06V 10/82* (2022.01); *G06V 20/13* (2022.01)

(56) References Cited

U.S. PATENT DOCUMENTS

2021/0261165 A1* 8/2021 Averbuch ............... G07C 5/008
2022/0108504 A1* 4/2022 Kenyon-Dean ........ G06V 20/13
2022/0156636 A1* 5/2022 Albrecht ............... G01C 11/04

OTHER PUBLICATIONS

CNIPA, Notification of a First Office Action for CN202111087346.6, dated Nov. 1, 2021.
Nanjing University of Information Science and Technology (Applicant), Reply to Notification of a First Office Action for CN202111087346.6, w/ allowed replacement claims, dated Nov. 10, 2021.
CNIPA, Notification to grant patent right for invention in CN202111087346.6, dated Nov. 18, 2021.

* cited by examiner

METHOD FOR FLOOD DISASTER MONITORING AND DISASTER ANALYSIS BASED ON VISION TRANSFORMER

TECHNICAL FIELD

The disclosure relates to flood disaster monitoring and disaster analysis methods, more particular to a method for flood disaster monitoring and disaster analysis based on vision transformer.

BACKGROUND

Natural disasters occur frequently in the world, among which floods occur most frequently. Flood disasters (also referred to as flood-waterlogging damages) are extremely destructive and pose a great threat to an ecological environment, human life, and property. Floods have characteristics of wide range, frequent occurrence, strong suddenness, and large loss. Large submerged area caused by flood outbreaks is dynamic, and it is very important to monitor flood areas in real time. Based on 3S (i.e., remote sensing, RS; geography information systems, GIS; and global positioning systems, GPS) technology and their mutual cooperation, which is a main means to monitor flood disasters. Flood submerged area is a basis of disaster assessment, which depends on timely and effective data. With the rapid development of remote sensing technology, a large number of satellite data are available for flood monitoring. Traditional researches of water body recognition (also referred to as water identification) mainly depends on different reflection intensity among water body and other surface objects in remote sensing images to extract water body information, among which the most widely used is the normalized difference water index (NDWI) proposed by Mcfeeters. In recent years, deep learning technology has developed rapidly and has been widely used in all walks of life. Different from traditional feature extraction methods, deep learning models can adaptively learn features from a large number of samples, and have advantages of universality and flexibility. Especially for a situation that a surface coverage of the disaster area changes greatly before and after the flood, the depth learning algorithm can quickly and efficiently identify the flood area. However, there are still the following shortcomings in the above technologies that make flood monitoring challenging. Firstly, the accuracy of traditional remote sensing methods for flood monitoring is not high, hardly exceeding 90%, and limited by available data and other factors. Secondly, semantic segmentation networks based on convolutional neural network (CNN) is often used in remote sensing image change detection and target recognition, but it is not satisfactory for a long range of spatiotemporal information.

In view of a fact that a current use of remote sensing technology for flood monitoring mainly depends on algorithms such as index method, threshold segmentation and machine learning, these methods are simple, easily limited by factors such as image quality, terrain, and human intervention, it is difficult to achieve accurate and efficient flood monitoring. In addition, since floods are often accompanied by clouds and rain, optical satellites can capture a lot of useful water information through clouds and mists, and it is unavoidable that there is a lack of available data for flood monitoring.

SUMMARY

In order to solve the above technical problems, the disclosure provides a method of flood disaster monitoring and disaster analysis based on vision transformer.

A technical solution of the disclosure is the method of flood disaster monitoring and disaster analysis, including:

step (1), constructing a bi-temporal image change detection model, where the bi-temporal image change detection model includes a convolutional neural network (CNN) framework, a semantic marker, and a transformer module comprising an encoder and a decoder;

step (2), selecting bi-temporal remote sensing images to make flood disaster labels; and step (3), performing flood monitoring and disaster analysis according to the bi-temporal image change detection model constructed in the step (1).

In an embodiment, an implementation process of the step (1) includes:

step (11), semantic feature extraction, which includes:

performing feature extraction by using the CNN framework to obtain changed water body features $X^i$ of bi-temporal remote sensing images;

processing the changed water body features $X^i$ by using a spatial attention mechanism $A^i$ to obtain a bi-temporal feature set $F^i$ expressed as follows:

$$F^i = (A^i)^T X^i,$$

where i represents a temporal order of remote sensing image, i=1, 2; T represents a transpose operation; and inputting the bi-temporal feature set $F^i$ into the transformer module;

step (12), transformer encoding, which includes:

encoding the bi-temporal feature set $F^i$ obtained in the step (11) to construct a rich semantic feature set $F'^i$ (also referred to as semantic feature set $F'^i$ with a spatiotemporal relationship; where a relationship between an attention mechanism and a softmax activation function is expressed as follows:

$$\text{Attention}(Q, K, V) = \text{softmax}\left(\frac{QK^T}{\sqrt{d}}\right)V$$

$$Q = F^{(l-1)} W^q$$

$$K = F^{(l-1)} W^k$$

$$V = F^{(l-1)} W^v$$

where, the attention mechanism is composed of Q, K and V function keys that control feature weights; l represents a number of layers of the CNN framework, $W^q$, $W^k$ and $W^v$ are learning parameters, and d represents a channel size;

step (13), transformer decoding, which includes:

decoding the rich semantic feature set $F'^i$ encoded in the step (12) by the decoder in a pixel space to optimize the changed water body features $X^i$ to obtain optimized changed water body features $X'^i$; and then calculating a feature difference image through shallow CNN to thereby obtain a prediction result at a pixel level.

In an embodiment, in the step (2), bi-temporal remote sensing images with a broad spatial scope and a long time scale are selected to make the flood disaster labels with a strong generalization; and an implementation process of the step (2) includes:

step (21), performing preprocessing of radiometric calibration, geometric correction, and logarithmic transformation on paired bi-temporal remote sensing images containing water bodies before and after a flood period in a previous year;

step (22), marking preprocessed bi-temporal remote sensing images by using an image marking tool; and then differentially labelling a changed part and an unchanged part of the water body after the flood period compared with the water body before the flood period by using an image processing software, to thereby obtain an image with a size same as its original size and with truth values of water body change; and step (23), segmenting marked bi-temporal remote sensing images into a sample inputtable into the bi-temporal image change detection model, screening the sample set to remove a sample having no water body change from the sample set; and dividing screened sample set into a training set, a validation set, and a testing set.

In an embodiment, the step (3) includes: training the bi-temporal image change detection model based on the flood disaster labels made in the step (2), and adjusting parameters of the model until a loss curve of the model is fitted and a value thereof approaches to 0 while an accuracy of identification of flood submerged area of remote sensing image reaches 95% or more.

Compared with the prior art, the disclosure has following remarkable effects. Firstly, the disclosure can acquire the data when the flood occurs and improve the recognition accuracy by combining the bi-temporal image change detection model based on the advanced vision transformer in the deep learning and the radar data that is not affected by time and weather and has strong penetration ability. Secondly, while providing a new method for monitoring flood, the disclosure can efficiently and accurately provide effective decision-making basis for flood disaster prevention and reduction, and has good social and economic effects.

DETAILED DESCRIPTION OF EMBODIMENTS

The disclosure will be further described in detail below in combination with the accompanying drawings and specific embodiments of description.

The disclosure proposes a bi-temporal image change detection model based on vision transformer for effectively modeling spatiotemporal information of microwave remote sensing images, so that water body change conditions before and after a flood can be efficiently obtained, and the flood disaster can be accurately monitored and analyzed. On the one hand, a vision transformer method is employed as a model framework of the disclosure, in which the transformer uses attention and other mechanisms to increase a receptive field and use the spatiotemporal information, which can effectively learn changes of a target in a high-resolution remote sensing image and make full use of the spatiotemporal information. On the other hand, the disclosure makes bi-temporal flood disaster labels, and takes remote sensing data before and after the occurrence of flood as training data of the model, which can be used to accurately monitor flood events and accurately identify a flood submerged area.

Specific steps are as follows.

Step 1, constructing a bi-temporal image change detection model based on vision transformer.

Figure 1:
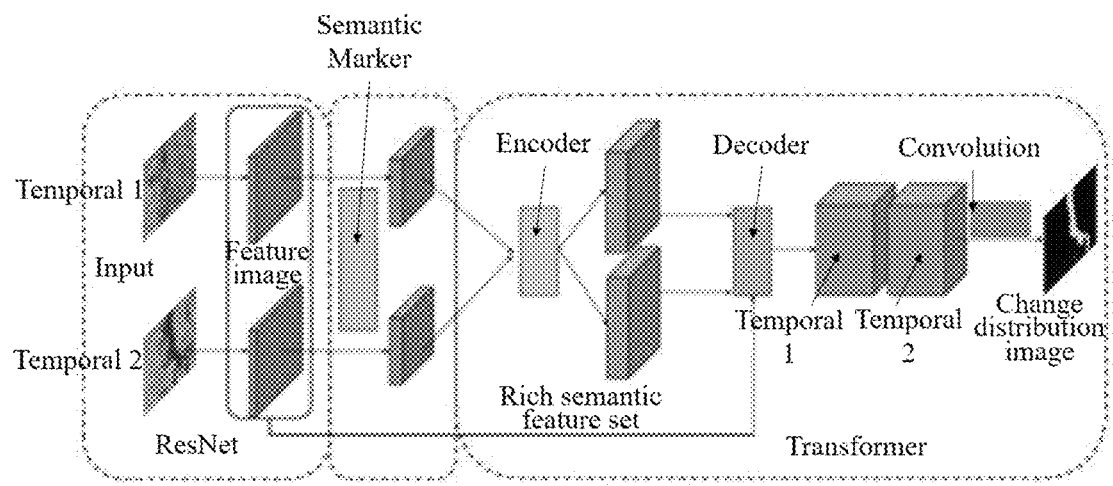
FIG. 1 illustrates a schematic diagram of a transformer decoder of the disclosure.

FIG. 1 illustrates a structural framework diagram of the bi-temporal image change detection model based on vision transformer of the disclosure, which mainly includes a CNN framework (ResNet), a semantic marker, and a transformer module (also referred to as transformer). The transformer may include an encoder and a decoder. An implementation process is as follows.

Step (11), semantic feature extraction

Specifically, a classical deep learning convolution neural network ResNet is used as a framework to extract semantic features of changes of a target water body in bi-temporal remote sensing images, and then a spatial attention mechanism is used to transform the remote sensing image feature mapping of each temporal into a rich semantic feature set.

Feature extraction is performed first by using the CNN framework to obtain changed water body features $X^i$ (i=1, 2) in the bi-temporal remote sensing images, and then a spatial attention mechanism $A^i$ is used to process the changed water body features $X^i$ (i=1, 2) to obtain a bi-temporal feature set $F^i$, and input the bi-temporal feature set $F^i$ into the transformer module; and the bi-temporal feature set $F^i$ is expressed as follows:

$$F^i = (A^i)^T X^i \qquad (1)$$

where i represents a temporal order of remote sensing images, and T represents a transpose operation of the remote sensing images.

Step (12), transformer encoding

Transformer can make full use of a global semantic relationship of bi-temporal remote sensing images, and therefore after generating rich semantic feature representation for each temporal, the encoder of the transformer is used to model the obtained bi-temporal feature set $F^i$ in spatiotemporal. The encoder encodes information about elements in relative or absolute locations in spatiotemporal because location information facilitates the encoder context modeling.

Figure 2:
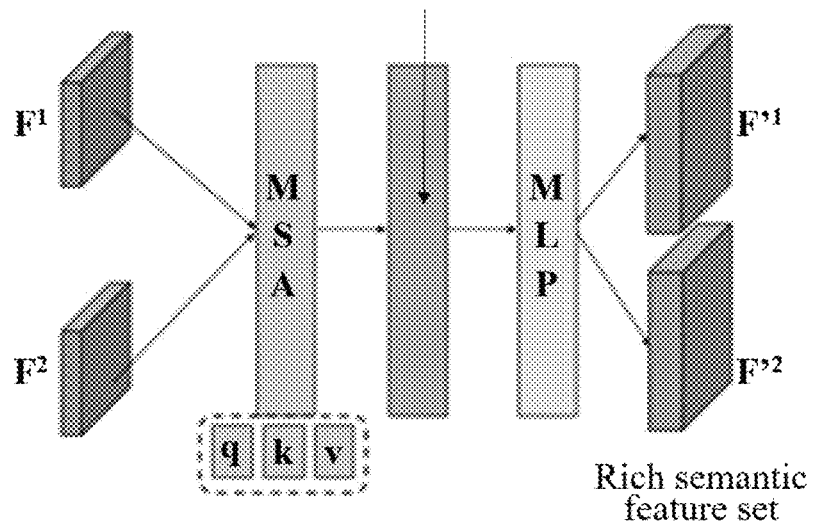
FIG. 2 illustrates a frame diagram of a bi-temporal image change detection model based on vision transformer, which is mainly composed of a convolutional neural network (CNN) framework (i.e., ResNet), a semantic marker, and a transformer module (including an encoder and a decoder).

As shown in FIG. 2, the bi-temporal feature set $F^i$ obtained in the step (11) is encoded, that is, a relationship of bi-temporal features in spatiotemporal is established to construct a rich semantic feature set $F'^i$ with a spatiotemporal relationship. Firstly, an operation of the attention mechanism is performed on the bi-temporal feature set $F^i$ by using multi-head self-attention (MSA), because MSA can connect information of different features from different locations. Then normalization is used to keep the bi-temporal feature set $F^i$ consistent in space, which is convenient for network feature extraction to be more stable. Finally, multi-layer perception (MLP) is used to better link the input bi-temporal feature set $F^i$ and the output rich semantic feature set $F'^i$, which improves the efficiency and stability of network training. Among them, MSA is an attention mechanism composed of Q, K and V function keys that control feature weights; MLP represents a multi-layer perception, and softmax is an activation function:

$$\text{Attention}(Q, K, V) = \text{softmax}\left(\frac{QK^T}{\sqrt{d}}\right)V \qquad (2)$$

$$Q = F^{(l-1)} W^q \quad (3)$$

$$K = F^{(l-1)} W^k \quad (4)$$

$$V = F^{(l-1)} W^v \quad (5)$$

where T is the transpose operation, l represents a number of layers of the network, $W^q$, $W^k$ and $W^v$ are learning parameters, and d represents a channel size.

Step (13), transformer decoding

The context rich semantic feature set $F^i$ obtained by the encoder is remapped into a pixel space by the twin decoder to enhance original pixel level semantic features. Finally, a feature difference image is calculated from two optimized feature images, and the feature difference image is input into shallow CNN to obtain a prediction result of water body change at a pixel level.

Step 2, flood disaster labels making based on microwave remote sensing of Sentinel-1

At present, flood monitoring is to identify the water body of each remote sensing image, so as to obtain a flood evolution process, which is a heavy workload, time-consuming, and laborious. The disclosure uses the paired bi-temporal remote sensing images to monitor the flood, and can quickly identify the flood submerged area through two remote sensing images of the same area before and after the disaster, which greatly shortens early-stage data processing time and improves the efficiency. In order to meet various application scenarios and monitor flood events in different regions at different times, bi-temporal microwave remote sensing images with a broad spatial scope and a long time scale are selected to make the flood disaster labels with strong generalization. A specific implementation process of the step 2 are as follows.

Step (21), in order to meet the requirement that data samples have good temporal and spatial generalization and can be applied to flood monitoring in different regions and seasons, the necessary preprocessing is performed on paired bi-temporal remote sensing images of Sentinel 1 in middle and lower reaches of the Yangtze River before and after the flood period from 2015 to 2020 years, including radiometric calibration, geometric correction, logarithmic transformation, etc.

Figure 3:
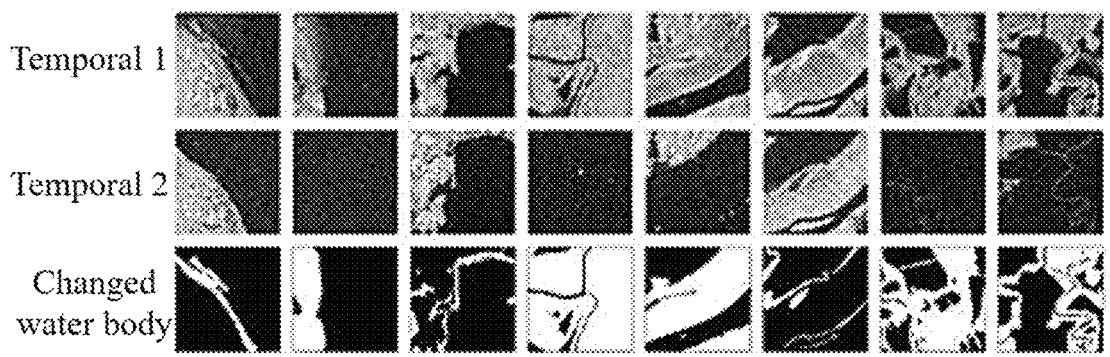
FIG. 3 illustrates a schematic diagram of a bi-temporal microwave remote sensing flood disaster label made by the disclosure, where the first row and the second row show Sentinel-1 data of two temporals, and the third row shows corresponding target change water body labels.

Step (22), according to shapes, textures, colors, and other information of the water body in synthetic aperture radar (SAR) images, the SAR images are annotated manually by visual interpretation to obtain a water body change result image of bi-temporal remote sensing images. Use photoshop (PS) and other image processing software to label a changed part of the water body due to flood period (flood) as white and an unchanged part of the water body as black (as shown in FIG. 3), and finally an image with a size same as its original size and with truth values of water body change is obtained.

Step (23), marked bi-temporal remote sensing images (i.e., annotated images in the step (22)) are respectively segmented into a fixed size that can be input into the model: 256*256 to thereby form a sample set. A marked dataset (i.e., the sample set) is segmented according to a channel size of the transformer of the model. In this situation, in order to improve the model training efficiency, samples in the sample set are screened and a sample without water body changes in the images are removed, which can effectively shorten the time of loading images during model training. A total of 6296 pairs of water body samples (a training set: 70%, a validation set: 20%, a testing set: 10%) are produced for Sentinel-1 images, which can be applied to flood monitoring in different regions and different phases.

Step 3, accurate flood monitoring and disaster analysis of Sentinel-1 by the change detection model based on vision transformer Step (31), the bi-temporal image change detection model based on vision transformer is trained by using the Sentinel-1 water body change dataset obtained from the step 2. By adjusting parameters, changing the loss function, and adjusting the network structure, until a loss curve of the network is fitted and the value is close to 0, the identification accuracy of the changed water body in the remote sensing images can reach 95% or more, which can meet the requirements of efficient and accurate identification of water body changes, so as to be applied to flood monitoring.

Step (32), a flood disaster situation is analyzed by combining a water body distribution image and land cover type data of disaster area obtained by the bi-temporal image change detection model, so as to obtain the expansion trend of the flood and the submerged area of different land surface types, and provide decision-making basis for flood disaster prevention and reduction.

The bi-temporal image change detection model including transformer is trained based on the above-mentioned the water body change dataset, and model parameters are adjusted, which can meet the ability of efficiently and accurately identifying the flood submerged area. According to the rapid and accurate monitoring of flood events, the water body change and the expansion trend of flood before and after the flood can be obtained, which can provide decision-making basis for flood disaster prevention and reduction. Combined with a local land use map, the submerged area and changes of different land surface types in the disaster area can be obtained, so that the damage caused by flood disasters can be quantitatively analyzed.

Figure 4:
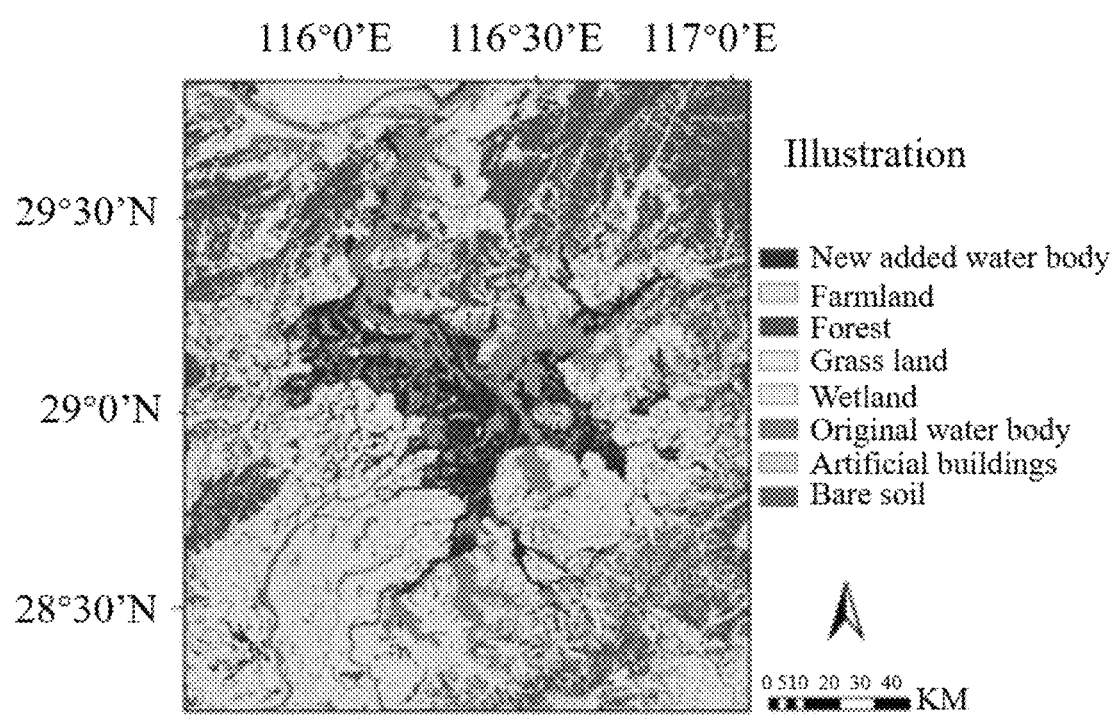
FIG. 4 illustrates a schematic diagram of flood disaster analysis in Poyang Lake area in the summer of 2020 year.

FIG. 4 illustrates a schematic diagram of flood disaster analysis in Poyang Lake area in a summer of 2020. Combined analysis of flood area and land cover type data identified by the bi-temporal image change detection model, a flood inundation situation of the disaster area is obtained.

The disclosure proposes a deep learning model for bi-temporal image change detection based on vision transformer, and adopts data of active microwave remote sensing satellite (Sentinel-1) capable of surveying an earth's surface through clouds, which can realize high-precision all-weather and all-weather flood disaster accurate monitoring and disaster analysis, and its technical indicators can improve a flood identification accuracy to 95% or more.

What is claimed is:

1. A method for flood disaster monitoring and disaster analysis based on vision transformer, comprising:
   step (1), constructing a bi-temporal image change detection model, wherein the bi-temporal image change detection model comprises a convolutional neural network (CNN) framework, a semantic marker, and a transformer module comprising an encoder and a decoder; and an implementation process of the step (1) comprises:
      step (11), semantic feature extraction, which comprises:
         performing feature extraction by using the CNN framework to obtain changed water body features $X^i$ of bi-temporal remote sensing images;
         processing the changed water body features $X^i$ by using a spatial attention mechanism $A^i$ to obtain a bi-temporal feature set $F^i$ expressed as follows:
         $F^i = (A^i)^T X^i$, where i represents a temporal order of remote sensing image, i=1, 2; T represents a transpose operation; and inputting the bi-temporal feature set $F^i$ into the transformer module;

step (12), transformer encoding, which comprises:

encoding the bi-temporal feature set $F^i$ obtained in the step (11) to construct a rich semantic feature set $F'^i$ with a spatiotemporal relationship; wherein a relationship between an attention mechanism and a softmax activation function is expressed as follows:

$$\text{Attention}(Q, K, V) = \text{softmax}\left(\frac{QK^T}{\sqrt{d}}\right)V,$$

$Q = F^{(l-1)}W^q,$ $K = F^{(l-1)}W^k,$ $V = F^{(l-1)}W^v,$ where, the attention mechanism is composed of Q, K and V function keys that control feature weights; l represents a number of layers of the CNN framework, $W^q$, $W^k$ and $W^v$ are learning parameters, and d represents a channel size;

step (13), transformer decoding, which comprises:

decoding the rich semantic feature set $F'^i$ encoded in the step (12) by the decoder in a pixel space to optimize the changed water body features $X^i$ to obtain optimized changed water body features $X'^i$, and then calculating a feature difference image through shallow CNN to thereby obtain a prediction result at a pixel level;

step (2), selecting bi-temporal remote sensing images to make flood disaster labels; wherein the bi-temporal remote sensing images with a target spatial range and a target time scale are selected to make the flood disaster labels with a target generalization, and an implementation process of the step (2) comprises:

step (21), performing preprocessing of radiometric calibration, geometric correction, and logarithmic transformation on paired bi-temporal remote sensing images containing water bodies before and after a flood period in a previous year;

step (22), marking preprocessed bi-temporal remote sensing images by using an image marking tool; and then differentially labelling a changed part and an unchanged part of the water body after the flood period compared with the water body before the flood period by using an image processing software, to thereby obtain an image with a size same as its original size and with truth values of water body change;

step (23), segmenting marked bi-temporal remote sensing images into a sample set inputtable into the bi-temporal image change detection model, screening the sample set to remove a sample having no water body change from the sample set, and dividing screened sample set into a training set, a validation set, and a testing set; and step (3), performing flood monitoring and disaster analysis according to the bi-temporal image change detection model constructed in the step (1).

2. The method according to claim 1, wherein the step (3) comprises: training the bi-temporal image change detection model based on the flood disaster labels made in the step (2), and adjusting parameters of the model until a loss curve of the model is fitted and a value thereof approaches to 0 while an accuracy of identification of flood submerged area of remote sensing image reaches 95% or more.

* * * * *